United States Patent [19]

Pohl

[11] 4,360,750

[45] Nov. 23, 1982

[54] ROTOR FOR AN ELECTRICAL MACHINE

[75] Inventor: Herbert Pohl, Hausen, Switzerland

[73] Assignee: BBC Brown, Boveri & Company, Limited, Baden, Switzerland

[21] Appl. No.: 171,831

[22] Filed: Jul. 24, 1980

[30] Foreign Application Priority Data

Jul. 26, 1979 [CH] Switzerland .................. 6905/79

[51] Int. Cl.³ .............................................. H02K 9/00
[52] U.S. Cl. ...................................... 310/54; 310/61;
310/71; 310/205; 62/331; 62/505
[58] Field of Search ...................... 310/54, 53, 57, 58,
310/59, 60 R, 60 A, 61, 64, 65, 71, 198,
201–208, 270, 43, 52; 339/15, 16 R, 112 L;
62/331, 505

[56] References Cited

U.S. PATENT DOCUMENTS

| | | | |
|---|---|---|---|
| 3,034,003 | 5/1962 | Seidner | 310/64 |
| 3,131,321 | 4/1964 | Gibbs | 310/54 |
| 3,459,979 | 8/1969 | Dickinson | 310/54 |
| 3,652,882 | 3/1972 | Elliott | 310/61 |
| 3,749,952 | 7/1973 | Lambrecht | 310/54 |
| 3,870,913 | 3/1975 | Shapiro | 310/54 |

FOREIGN PATENT DOCUMENTS 2506874 8/1976 Fed. Rep. of Germany ........ 310/71

OTHER PUBLICATIONS

Brown Boveri Review; Issue 1; pp. 36–41; Jan. 1978.

Primary Examiner—R. Skudy
Attorney, Agent, or Firm—Oblon, Fisher, Spivak, McClelland & Maier

[57] ABSTRACT

A rotor device for use in an electrical machine is disclosed which includes a liquid-cooled single or multi-layer winding whose end turns are electrically interconnected in the rotor end coil through connectors. The connectors form portions of cooling liquid supply or return lines and are connected by insulated pipes to one or more liquid chambers located at the rotor end.

8 Claims, 5 Drawing Figures

ROTOR FOR AN ELECTRICAL MACHINE

BACKGROUND OF THE INVENTION

1. Field of the Invention

The present invention relates in general to a novel rotor for an electrical machine with a liquid-cooled single or multi-layer winding whose end turns are electrically interconnected in the rotor end coil through connectors whereby the connectors are designed, at least partially, as cooling liquid supply or cooling liquid return lines and are connected to one or several water chambers at the rotor and through insulating parts.

2. Description of the Prior Art

Liquid-cooled rotors for electrical machinery have been described in publications, such as in the "Brown Boveri Review", Issue 1, January 1978, pages 36 to 41. The rotor winding of this known turbo-generator is cooled with water. Four conductors of the field winding and one conductor of the damper winding are placed on top of each other in each rotor slot. The conductors of the field winding have circular cooling channels in which the water circulates. As can be noted from page 38, FIG. 4, of this publication, the conductors in the coil head on the side away from the drive are bent off outside the straight running part of the slot. The end turns of a winding layer are always electrically and hydraulically connected with each other and with end turns of another winding layer through radial connectors so that the end turns cross each other in the end coil.

The cooling water reaches the winding or leaves the winding at the electric connection point between two conductors through an insulation stretch. The supply of cold water and the discharge of the warm water is effected through water chambers which provide the connection with the outside water cycle through a radial and axial piping system (cf. FIG. 8 of the above mentioned publication).

SUMMARY OF THE INVENTION

Accordingly, one object of the present invention is to provide a liquid-cooled rotor for an electrical machine which has been optimized from both a production and an operational point of view whereby a reduction in the stress on the highly strained rotor caps is achieved.

In order to accomplish this objective, it is provided according to the present invention that the end turns of each winding layer are essentially on the same radial level in the coil end and are electrically and hydraulically connected with each other by means of connectors running in a circumferential direction. The connectors have an inside shank which is designed as liquid supply or return line, respectively.

Due to the design and arrangement of the end turn according to the present invention, the axial length of the coil end is reduced by approximately 15% in comparison with the prior art arrangements. Thus, the axial length of the rotor cap can be made shorter. Additionally the field losses are reduced by the shortening of the coil end. An additional advantage of the present invention lies in the fact that the connection between the end turns and the connectors can be partially made outside the machine which is not possible with the cross end turns of the prior art rotor. An optimum guiding of the liquid is obtained independently of centrifugal and Coriolis forces, which, in turn, results in a more uniform heat dissipation, due to the radial guiding of the cooling liquid and its branching off on the same radial level into the parts of the connectors running in a circumferential direction.

As far as space requirements are concerned, it is particularly favorable when the end turns in the coil end run essentially in parallel to each other as in the present invention.

In accordance with another design of the present invention, when looked at in the longitudinal axis of the rotor, successive end turns are connected, in turn, to the cooling agent supply and the cooling agent return. In this way, the insulating parts can be comprised in groups. One group of insulating parts is then always assigned to one water chamber.

In the case of a two-layer winding, at least the winding conductors of the inner winding layer are bent off towards the rotor axis; the connectors in the end turns of the outer winding layer are placed between the inner and outer layer and those of the inner layer are arranged below the inner layer. This results in a clear design facilitating feature for control purposes. While the end turns in the coil end rest almost directly on the rotor cap in case of a one-layer winding, supporting elements are provided for a two or multi-layer winding between the individual end turn layers which are preferably designed as annular segments.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
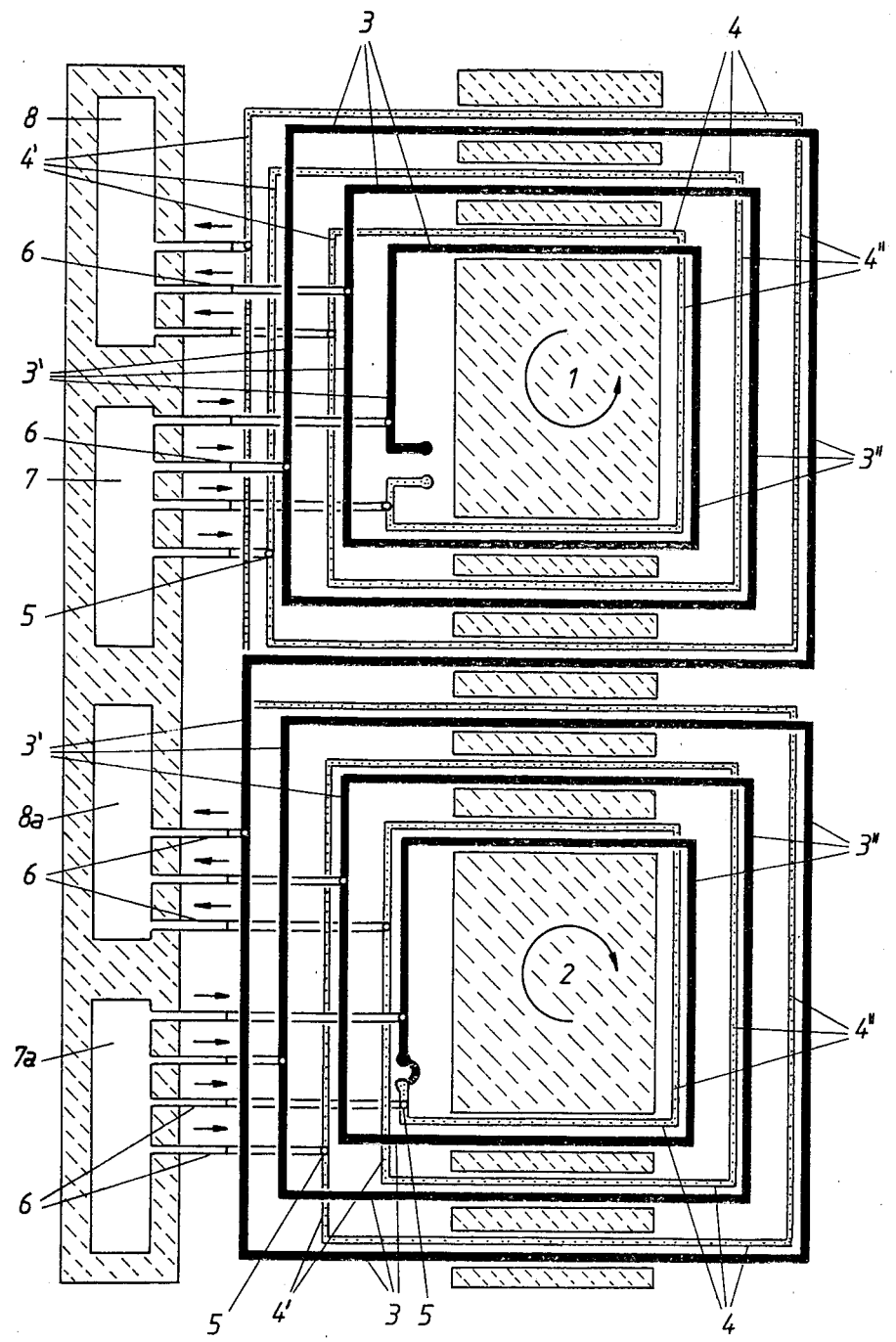
FIG. 1 illustrates the electrical and hydraulic connections for the rotor winding of a turbo-generator.

Referring now to the drawings, wherein like reference numerals designate like or corresponding parts throughout the several views, and more particularly to FIG. 1 thereof, the electrical and hydraulic connections for the rotor winding of a turbo-generator are illustrated. For reasons of clarity, FIG. 1 illustrates a 2-pole rotor with pole zones 1 and 2 and six winding slots between the two pole zones. The illustrated winding is a liquid-cooled two-layer winding wherein the winding conductors of the outer or upper layer 3 are shown as thick lines in the coil end as well as in the slot portion and the winding conductors of the inner, or lower layer 4 are shown as double lines with a dotted line therebetween. In order to further simplify the representation in FIG. 1, only one winding conductor of the upper and lower layer is shown in each slot. The end turns 3" and 4" in the coil end on the side of the drive always run on the same radial levels as in the case of the arrangement according to the "Brown Boveri Review" article discussed above. In the prior art devices, the end turns in the coil end on the side away from the drive must all change their radial levels so that the corresponding electric and hydraulic connections can be made. The electric and hydraulic connection of the winding conductors 3 or 4, respectively, is effected in the present invention through end turns 3' or 4', respectively which are also on the same radial level. The necessary cooling liquid supply or return, respectively, as well as the electrical connection is effected through connectors 5 in this instance (plotted only as circles in FIG. 1). The end turns 3' or 4' respectively, run essentially in parallel with each other. When observed in the longitudinal axis of the rotor, successive end turns for a layer are connected, in turn, to the water chambers 7, 7a or 8, 8a, respectively, serving as cooling liquid supply or cooling liquid discharge, respectively, through the insulating parts 6. The insulating parts of an end turn layer can thus be comprised in groups whereby each group is connected to one water chamber. The insulating parts 6 of each layer run at approximately the same distance from the rotor axis and are directly adjacent to each other in a circumferential direction.

Figure 2:
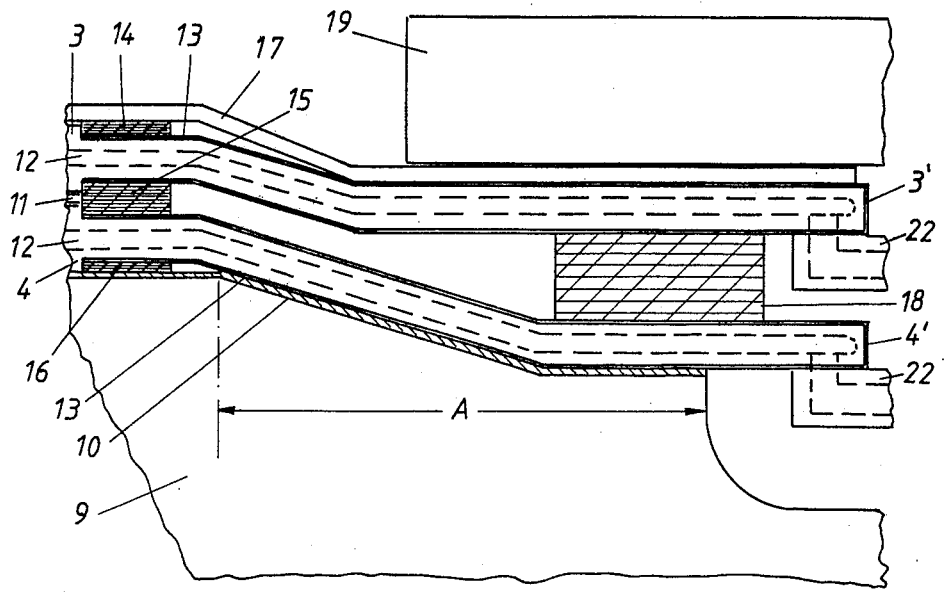
FIG. 2 is a simplified illustration of a cross-section taken through the end of a turbo-rotor on the side away from the drive.

FIG. 2 illustrates the actual position of the end turns in the coil end of the side away from the drive. The liquid-cooled rotor winding is placed in slots in the rotor body 9 by positioning it between a slot insulation 10 and a layer insulation 11. The depth of the slot increases in the end of the active part (area A) towards the rotor axis. The winding conductors 3 and 4 include cooling channels 12 and are provided with a conductor insulation 13. The winding conductors 3 and 4 are tapered in a radial direction before leaving the active part. Spacers 14, 15, and 16 support the winding conductors. The damper winding well known in the art is designated by the reference number 17 and cooperates with the rotor winding for the attenuation of pendulum oscillations, and in case of a single-phase and unbalanced loads, for the damping of the counter-rotating rotary field. The winding conductors 3 and 4 are radially bent off at an angle towards the inside on the side of the coil end and thus create a space for the electric and hydraulic connection of the end turns of one layer with each other and with the water chambers 7, 7a or 8, 8a, respectively, (not shown in FIG. 2). In the case of the two-layer winding represented here the connectors 5 of the end turns 3' of the upper layer are placed between the inner and outer end turn layers. Supporting elements 18, for example, of insulation material, uniformly distributed over the circumference and designed as annular segments are arranged between the two layers. Thus, the inner end turn layer 4 rests against the outer end turn layer 3 which, in its turn, is held in place by the rotor cap 19. It is not necessary to describe further details herein concerning the coil end, such as the structure and fixing of the rotor cap, design and arrangement of the water chambers and such since these constructional details are part of the state of the art (for example, see "Brown Boveri Review", Issue 1, 1978, pages 36 to 41, especially FIG. 8 on page 41).

Figure 3:
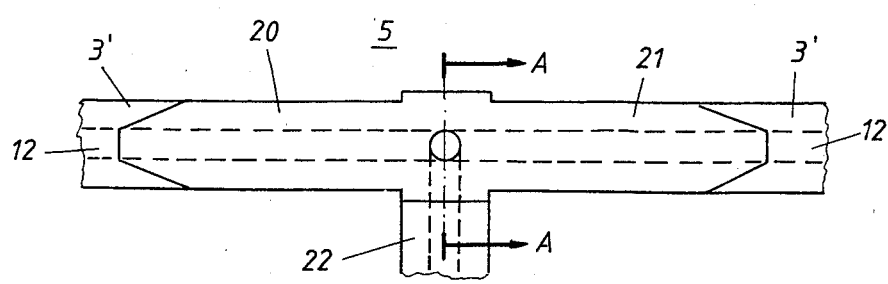
FIG. 3 is a top view of a connector for the electrical and hydraulic connection of the end turns in the rotor coil end.
Figure 4:
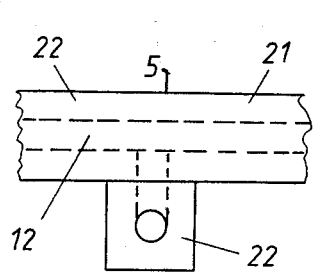
FIG. 4 is a lateral view of a connector for the electrical and hydraulic connection of the end turns in the rotor coil end.
Figure 5:
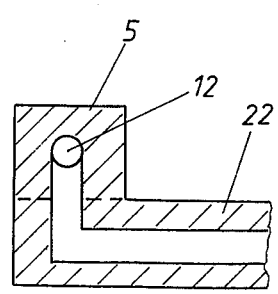
FIG. 5 is a cross-section along a line A—A through the connector shown in FIG. 3.

FIGS. 3, 4 and 5 show the constructional design of a connector. Each connector 5 has three shanks 20, 21, and 22. Shank 22 lies radially within the two other shanks and runs axis-parallel. The insulating part 6 is connected to shank 22 which provides the connection to the respective water chamber 7, 7a, 8 or 8a, respectively. As insulating parts, for example, cooling water hoses known from the German Publication No. 25 06 874 can be used. The other two shanks 20 and 21 are conically beveled at their ends where they are hard-soldered with the correspondingly designed ends of the end turns 3' or 4', respectively. The axial length of the shank 22 depends on the position of the respective end turn 3' assigned to it and is selected in such a manner that all cooling water hoses (insulating parts 6) have the same length. It can be advantageous in this context to place, besides the supporting elements 18, additional spacers of insulating material (not shown) between radially successive shanks 22, end turns or between them and the rotor cap 19.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In a rotor device for an electrical machine having a liquid-cooled winding including at least one winding layer, said at least one winding layer including a plurality of conductors positioned in a plurality of slots in said rotor and a plurality of end turns located at an end of said rotor, each of said plurality of end turns coupling two of said plurality of conductors across said end of said rotor, the improvement comprising:
   a plurality of electrically conductive connector means for coupling liquid to said at least one winding layer, one of said plurality of connector means being associated with each of said plurality of end turns, each of said plurality of connector means including a liquid passageway therein, each of said plurality of connector means acting as one of a liquid supply connector and a liquid return connector;
   a plurality of liquid chambers associated with said connector means; and
   a plurality of insulated liquid coupling means for coupling said plurality of liquid chambers to said plurality of connector means, each of said plurality of coupling means coupling one of said plurality of liquid chambers to one of said plurality of connector means;
   wherein each of said plurality of end turns are located equally distant from an axis of rotation of said rotor on all sides of said rotor, each of said plurality of connector means being spaced about a circle concentric with said axis of rotation; and
   wherein each of said plurality of connector means includes a shank portion including a liquid passageway therein, each shank portion extending out of the plane formed by said associated end turn axially into the direction of said associated chambers, and each said shank portion forming a liquid connection between one of said plurality of insulated coupling means and one of said plurality of connector means.

2. An improved rotor device as recited in claim 1, wherein said liquid-cooled winding includes:
   first and second winding layers, said first winding layer including a first plurality of end turns, said second winding layer including a second plurality of end turns, said first plurality of end turns being essentially parallel to said second plurality of end turns.

3. An improved rotor device as recited in claim 1, wherein:
said plurality of liquid chambers includes at least one liquid supply chamber and at least one liquid return chamber, each of said plurality of connector means spaced about said circle being alternatingly coupled to said at least one supply chamber and said at least one return chamber.

4. An improved rotor device as recited in claim 1, wherein:
each shank portion of each one of said plurality of connector means is positioned in parallel with said axis of rotation of said rotor.

5. An improved rotor device as recited in claim 1, wherein:
said plurality of insulated coupling means are organized into a plurality of groups of insulated coupling means, each of said plurality of groups being coupled to one of said plurality of liquid chambers.

6. An improved rotor device as recited in claim 5, wherein:
said insulated coupling means included in each group are located directly adjacent to each other in a circumferential direction with respect to said axis of rotation of said rotor and are each located equally distant from said axis of rotation.

7. An improved rotor device as recited in claim 2, wherein:
said first winding layer is an inner layer and said second winding layer is an outer layer with respect to said axis of rotation of said rotor, said inner first winding layer including a first plurality of conductors positioned in said plurality of slots in said rotor and said outer second winding layer including a second plurality of conductors positioned in said slots, each of said first and said second plurality of conductors including end conductor portions located near said end of said rotor, each of said end conductor portions of at least said first plurality of conductors being bent at an angle towards said axis of rotation of said rotor;
said plurality of connector means of said second winding layer being positioned between said first plurality of end turns and said second plurality of end turns; and
said plurality of connector means of said first winding layer being position between said first plurality of end turns and said axis of rotation of said rotor.

8. An improved rotor device as recited in claim 7, which further comprises:
a plurality of supporting elements located between said first plurality of end turns and said second plurality of end turns, each of said plurality of supporting elements being annular in shape.

* * * * *